United States Patent [19]
Westerhof et al.

[11] 3,723,482
[45] Mar. 27, 1973

[54] 17β-HYDROXY-17α-(2'-METHALLYL)9β, 10α-ANDROSTA-1,4,6-TRIEN-3-ONE, METHODS OF PRODUCING THIS COMPOUND AND PHARMACEUTICAL COMPOSITIONS COMPRISING SAID COMPOUND AS AN ACTIVE INGREDIENT

[75] Inventors: Pieter Westerhof; Lucas Morsink, both of Van Houtenlaan, Weesp, Netherlands

[73] Assignee: U.S. Philips Corporation, New York, N.Y.

[22] Filed: July 13, 1970

[21] Appl. No.: 54,616

[30] Foreign Application Priority Data

July 16, 1969 Great Britain.....................35,861/69

[52] U.S. Cl. ................260/397.4, 195/51, 424/243
[51] Int. Cl.............................................C07c 169/22
[58] Field of Search ....... Machine Searched Steroids

[56] References Cited

UNITED STATES PATENTS 3,362,968  1/1968  Reerink et al.....................260/397.4

Primary Examiner—Henry A. French
Attorney—Frank R. Trifari

[57] ABSTRACT

A progestationally active 17α-(2'-methallyl)-9β, 10αandrosta-1,4,6-triene-3-one. 17β-hydroxy-17α-(2'-methallyl)9β, 10α-androsta-1,4,6-trien-3-one, methods of producing this compound and pharmaceutical compositions comprising said compound as an active ingredient.

1 Claim, No Drawings

17β-HYDROXY-17α-(2'-METHALLYL)9β,10α-ANDROSTA-1,4,6-TRIEN-3-ONE, METHODS OF PRODUCING THIS COMPOUND AND PHARMACEUTICAL COMPOSITIONS COMPRISING SAID COMPOUND AS AN ACTIVE INGREDIENT

It was found that the compound 17β-hydroxy-17α-(2'-methallyl)-9β,10α-androsta-1,4,6-trien-3-one, which can be represented by the formula

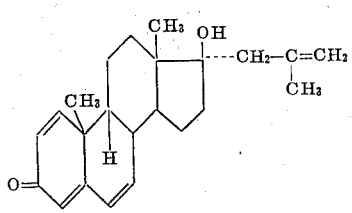

has very interesting pharmacological properties. In particular this compound shows a surprising high progestational activity both after oral and parenteral administration.

Furthermore the compound is uterotropic, anti-uterotropic, anti-estrogenic, anti-androgenic, and gonadotropin inhibiting.

Closely related compounds are known from the Dutch Patent specification No. 113,947. Thus, e.g. the compounds 17β-OH--17α-(2'-methallyl)-9β,10α(androsta-4,6-dien-3-one and 17β-hydroxy-17α-(2'-methallyl)-9β,10α-androst-4-en-3-one are known pharmacologically active agents with e.g. progestational activity.

Surprisingly it was found that the compound according to the invention, though very closely related chemically to the above indicated known compounds, exhibits a progestational activity which is about 2–7 times higher than that of the known compounds.

Also the anti-estrogenic activity of the inventive compound proves to be considerably higher than that of the known steroids.

When the oral and parenteral progestational activity of the inventive compound are compared with those of Dydrogesterone, a well-known progestational agent with the trade name Duphaston, it appeared that the present compound is about 20–30 times more active than Duphaston.

Due to its high hormonal activity the inventive compound, when worked up to the usual compositions such as tablet, pill, capsule, injection liquid, may advantageously find use in the treatment of e.g. stop bleeding, climacterial disorders, premature labor, primary and secondary amenorrhoe and as a contraceptive agent.

The employed dose may vary somewhat according to the nature and seriousness of the condition to be treated. Generally the dose may be related to that of Duphaston whereby the dose is as much less as the activity of the present compound surpasses that of Duphaston.

The compound according to the invention is a new chemical substance which may be prepared according to methods known per se for the production of analogous compounds.

Thus the compound according to the invention may be produced according to methods which are characterized in that:

a. the compound 17β-hydroxy-17α-(2'-methallyl)-9β,10α-androsta-4,6-dien-3-one is subjected to a 1,2-dehydrogenation reaction to introduce a double bond between the carbon atoms 1 and 2;

b. the compound 9β,10α-androsta-1,4,6-triene-3,17-dione is reacted with a 2-methallyl Grignard compound or with an alkali metal 2-methallyl compound, followed by the decomposition of the intermediately formed addition product.

The above indicated methods (a) and (b) may be explained in more detail as follows.

*ad a*

The introduction of a 1,2-double bond can be carried out according to one of the following processes.

I. By microbiological 1-dehydrogenation e.g. with Corynebacterium Simplex,
   A. Nobile, et al., J. Am. Chem. Soc. 77, 4,184 (1955).

II. By direct 1-dehydrogenation
   1. with iodine pentoxids or periodic acid Dutch Patent application 215,154 and 211,626
   2. with selenium dioxide,
      J.H. Fried et al., J. Am. Chem. Soc. 81, 1235 (1959)
      A. Bowers, et al., J. Am. Chem. Soc, 81, 5991 (1959)
   3. with chloranil e.g. for the conversion of 3-keto-Δ4 into 3-keto-1,4,6-steroids,
      E.J. Agnello and G.D. Laubach, J.Am. Chem. Soc. 82, 4,293 (1960),
   4. with 2,3-dichloro-5,6-dicyanobenzoquinone, D. Burn et al., Proc. Chem. Soc. 1960, 14,
   5. dehydrogenation of 3-keto-steroids with lead tetra acetate,
      R.L. Clarke, J.Am. Chem. Soc. 77, 661 (1955),
      R. Joly, Bull, Soc., 366 (1958).

III. by selective 1,2-dehydrohalogenation of 2-halo-3-keto-steroids e.g. with an organic base such as collidine or with lithiumbromide and lithium carbonate in dimethyl-formamide,
   C. Djerassi, J. Am. Chem. Soc. 71, 1,003 (1949).

*ad b*

The process according to method (b) deals with the alkenylation of a 17-keto group by reaction with 1. a Grignard reagent of the formula R-Mg-X, wherein R represents a 2-methallyl group and X stands for a halogen atom.
2. a compound of the formula MeR, wherein Me stands for an alkalimetal atom such as Na, K or Li and R represents a 2-methallyl group.

The reaction with the Grignard reagent proceeds in the presence of a solvent such as ethers for example, diethylether, dioxan or tetrahydrofuran. The reaction with the alkali metal 2-methallyl compound may be carried out in liquid $NH_3$ as the reaction medium, if desired in the presence of a solvent such as dioxan, tetrahydrofuran or diethylether. Instead of liquid $NH_3$, a secondary or teriary aliphatic alcohol, such as propanol-2, tertiary butanol or tertiary amylalcohol, may be used as a reaction medium.

After the alkenylating reaction, the intermediately formed addition product may be decomposed in an aqueous medium such as an aqueous $NH_4Cl$-solution.

In some cases it is preferred to protect the 3-keto group during the alkenylating reaction. This can be done for example by converting said group to a derivative which does not react with the reaction medium.

Thus the 3-keto group may be converted e.g. to a 3-enamine or 3-ketal group, followed, after the alkenylating reaction took place, by hydrolysis to reainstall the original 3-keto group.

A 3-enamine group may be prepared by reacting a 3-keto group with a secondary amine such as pyrrolidine. 3-ketals may be produced by reacting a 3-keto group with an aliphatic diol, such as ethylene glycol or propylene glycol.

The compound according to the invention may be worked up to pharmaceutical compositions in the usual manner. Thus the compound according to the invention may be compounded in the form of pills, capsules, tablets and in liquid form for oral administration and also be worked up to injection liquids for parenteral administration. Tablets may be produced for example by mixing the compound with inert carrier material such as sacharose, lactose, amylum together with fillers, surface-active agents or lubricants such as talcum, magnesium stearate or a carboxy-methyl cellulose. Injection liquids can be produced by dissolving a methylene chloride solution of the compound in arachid oil and by subsequent evaporation of the methylene chloride, while working under sterile conditions.

The invention may be explained in more detail by the following examples.

Example I

Preparation of 17β-hydroxy-17α(2'-methallyl)-9β,10α-androsta-1,4,6-triene-3-one

To a solution of 3,33 g 17β-hydroxy-17-(2'-methallyl)-9β,10α-androsta-4.6-dien-3-one and 2.78 g dichlorodicyanobenzoquinone in 92.5 ml dry and purified dioxan were added 2.06 ml of a dioxan/hydrogen chloride solution containing 45.9 mg HCl/ml. After stirring in a nitrogen atmosphere at room temperature for 90 minutes 300 mg calcium carbonate were added and stirring was continued for another 15 minutes. The reaction mixture was filtered and the filtrate was refluxed in an atmosphere of nitrogen for 90 minutes. Then the dioxan was removed in vacuo and the residue dissolved in methylene chloride. This solution was washed with water (three times), 2N sodium hydroxide solution (four times) and water. The organic layer was dried over sodium sulphate.

After filtration the solvent was removed and the residue chromatographed on silicagel (1:20). Combination of the appropriate fractions and two recrystallizations from ether yielded finally a pure sample of 17β-hydroxy-17-(2'-methallyl)-9β,10α-androsta-1,4,6-trien-3-one. Melting point 97°–99°C; (305 nm) = 12.100; $[\alpha]_D^{25} = -467°$ (CHCl$_3$)

Example II 2 g of 17β-hydroxy-17α-(2'-methallyl)-9β,10α-androsta-1,4,6-trien-3-one were dissolved in chloroform, which solution was mixed homogeneously, with 194 g of lactose. The mixture was dried at 40°C during 1 hour. The mixture was wettened with a 10%-ic aqueous solution of 2 g of gelatine and subsequently ground through a 20 mesh sieve. The mixture was dried at 40°C during 24 hours, whereupon the granules were ground through a 20 mesh sieve. The mixture was weighed and then had added to it proportional amounts of talcum venetum and magnesium stearate in amounts of optimal 25 mg and 2 mg respectively. The resulting mixture was homogenized and worked to tablets of 225 mg each.

Example III

Injection liquids of 17β-hydroxy-17α-(2'-methallyl)-9β,10α-androsta-1,4,6-trien-3-one were produced as follows.

5 g of 17β-hydroxy-17α-(2'-methallyl)-9β,10α-androsta-1,4,6-triene-3-one were dissolved in 90 mls of a solution of 2 percent w/v benzylalcohol and 46 percent w/v benzylbenzoate in ricinic oil at a temperature of 60°C. The solution was cooled to room temperature and replinished to 100 mls with the ricinic oil solution aforesaid. The mixture was homogenized by stirring and filtrated. Ampouls and vials were filled with the filtrated solution, subsequently sealed and then sterilized by heating for one hour at 120°C.

What is claimed is:

1. 17β-hydroxy-17α-(2'-methallyl)-9β, 10α-androsta-1,4,6-trien-3-one.

* * * * *